United States Patent [19]

Todd et al.

[11] 4,003,191
[45] Jan. 18, 1977

[54] BARRIER MEANS IN A COMBINE HARVESTING HEADER

[75] Inventors: Robert R. Todd, Leola, Pa.; Thomas W. Taege, Columbia, Mo.

[73] Assignee: Sperry Rand Corporation, New Holland, Pa.

[22] Filed: Mar. 29, 1976

[21] Appl. No.: 671,647

[52] U.S. Cl. ............................... 56/14.6; 130/27 R; 56/209; 56/106; 198/669
[51] Int. Cl.² .............................................. A01D 45/02
[58] Field of Search ............... 56/14.3, 14.4, 14.5, 56/14.6, 209, 105, 106; 130/27 R, 27 H–27 AE; 198/217

[56] References Cited
UNITED STATES PATENTS

| | | | |
|---|---|---|---|
| 2,755,912 | 7/1956 | Ashton | 56/364 X |
| 3,201,928 | 8/1965 | Claas | 56/98 |
| 3,244,271 | 4/1966 | Wenning | 56/14.5 X |
| 3,324,639 | 6/1967 | Halls et al. | 56/14.4 |
| 3,412,534 | 11/1968 | Teale | 56/16.4 |
| 3,470,682 | 10/1969 | Evans | 56/105 |
| 3,520,121 | 7/1970 | Ashton et al. | 56/106 |
| 3,794,046 | 2/1974 | Muijs | 130/27 T |

*Primary Examiner*—Russell R. Kinsey
*Attorney, Agent, or Firm*—C. Hercus Just; Frank A. Seemar; John R. Flanagan

[57] ABSTRACT

A harvesting header for a combine in which a consolidating auger of appreciable length extends transversely to the longitudinal axis of the combine and said auger having reversely spiralled flights respectively extending inward from opposite ends of the auger toward the midpoint of the axis thereof, the improvement comprising barrier means in the form of one or more discs on said auger between the inner ends of said flights and operable to prevent any substantial movement of ears of corn along the auger trough past the center of the auger when the combine is operating on a sloping field area.

9 Claims, 5 Drawing Figures

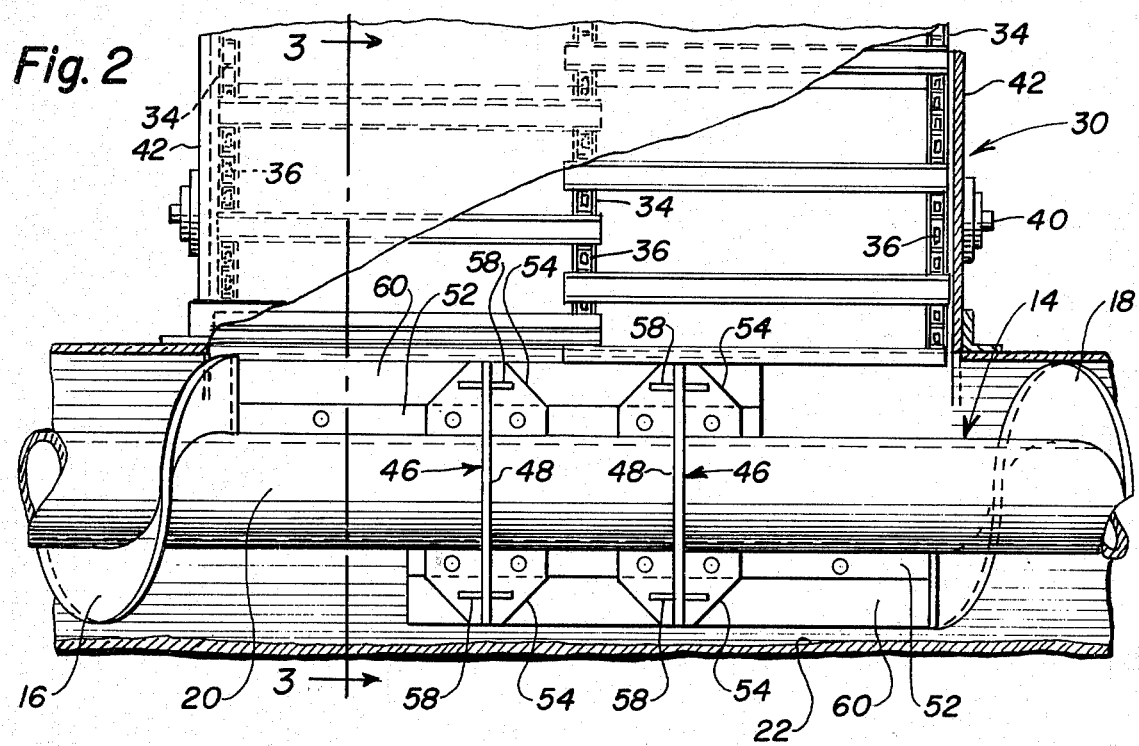
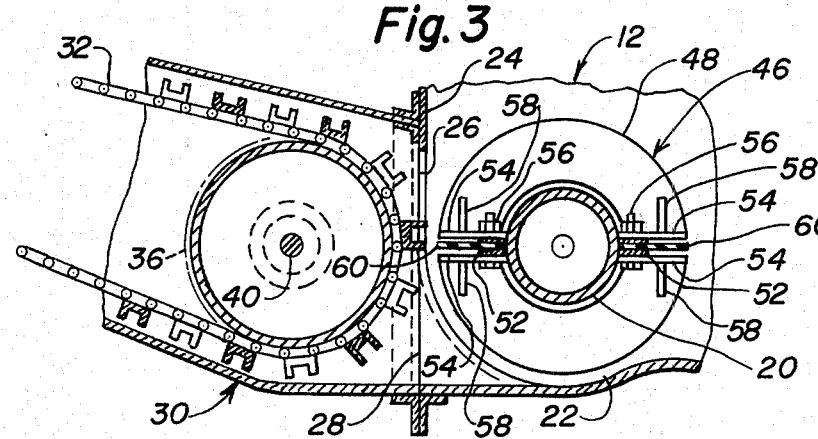
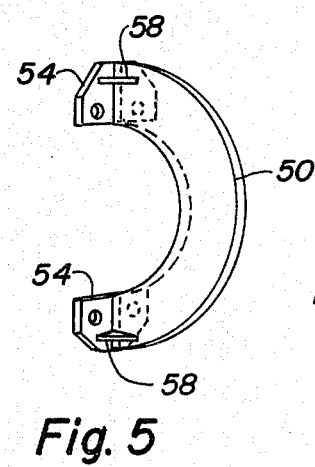
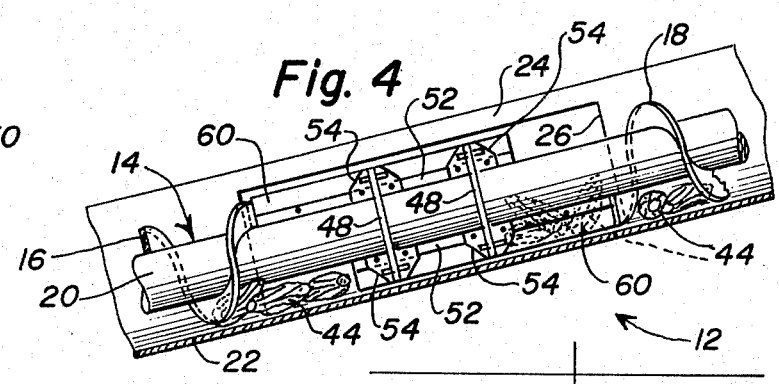

BARRIER MEANS IN A COMBINE HARVESTING HEADER

BACKGROUND OF THE INVENTION

Combines normally have a transversely extending header on the forward end thereof which receives crop material from the field by either severing stalk portions thereof or removing ears or heads thereof from the stalks and subjects the received materials to a transversely extending auger that normally extends substantially the full length of the header. The header auger has reversely spiralled flights extending inward from opposite ends thereof toward the center for purposes of consolidating the crop material for discharge through a central opening in the header which directs the consolidated material onto the lower, inlet end of an upwardly and rearwardly extending elevator which, in turn, discharges the material to the inlet end of the threshing mechanism in the combine. Due particularly to the transverse extent of the header and auger, it has been found that when the combine is operating on sloping terrain, there is a tendency for the cut crop material, especially, ears or heads of corn, maise and the like, to slide along the auger trough which produces a heavier accumulation of the crop material in the lower portion of the header, relative to the slope of the terrain, than in the upper portion. This results in uneven feeding of the material by the elevator to the threshing equipment, whereby the full threshing capacity of the combine is not utilized. Other undesirable results include a heavier concentration of the threshed crop material along one side of the grain pan and cleaning mechanism of the combine than along the other side.

Various attempts have been made heretofore to minimize the occurrence of such uneven distribution of material in the headers, elevators and threshing mechanism of combines, whether of the single or multiple axially or longitudinally-extending threshing compartment type or the transversely-extending threshing compartment type. Included among these attempts are the mechanisms comprising the subject matter of U.S. Pat. Nos. 3,244,271, 3,294,133, 3,681,901, and 3,794,046.

However, in none of these patents, is there any suggestion of preventing longitudinal movement of the crop material along the trough of the auger from one end to the opposite end thereof due, for example, to sloping conditions of the field area upon which the combine is operating.

SUMMARY OF THE INVENTION

The present invention is directed to highly suitable and effective means for preventing any appreciable longitudinal sliding movement of cut crop material, and especially relatively heavy crop material such as ears or heads of corn, maize and the like, from one half of the header into the other half due to gravity operating upon the sloping auger trough in cooperation with the initial velocity imparted to the ears by the auger.

Accordingly, it is the principal object of the present invention to provide a harvesting header for a combine which includes a longitudinally extending consolidating auger of appreciable length which is disposed transversely to the longitudinal axis of the combine, the auger having flights respectively extending inward from opposite ends toward the midpoint of the auger, in combination with barrier means connected to said auger generally centrally between the inner ends of said flights in the form of disc means generally being of a height relative to the height of the flights of the auger which is suitable to provide a sharply defined barrier to prevent any appreciable axial movement of the crop material, such as ears or heads of corn, maise, etc., past the central area of the auger and thereby assure relative even feeding of crop material to the elevator and, consequently, to the threshing mechanism of the combine.

It is another object of the invention to provide said disc means substantially centrally of the auger in the form of a pair of discs, preferably being similar and spaced a limited distance axially on opposite sides of the midpoint of the auger so as to thereby effect distinct separation between mats or streams of crop material respectively delivered by said auger flights to the inlet end of the elevator and, subsequently, to the threshing unit or units of the combine, depending upon the type of threshing mechanism and number of threshing units employed in the combine.

A still further object of the invention is to enhance the feeding function of the auger with respect to the inlet end of the elevator by providing on the auger relative to said barrier discs, radial beater blades which are fixed to the central axial tube of the auger upon which the flights are supported, said blades extending between said pair of discs and, as a further improvement, said blades also extending between the inner ends of the flights and said discs.

Still another object of the invention is to provide discs which have a height substantially equal to that of said flights of said auger.

One further object of the invention also is to have the outer edges of the radially extending beater blades substantially coextensive with the rims of the barrier discs.

Details of the foregoing objects and of the invention, as well as other objects thereof, are set forth in the following specification and illustrated in the accompanying drawings comprising a part thereof.

BRIEF DESCRIPTION OF THE DRAWINGS

FIG. 2 is a fragmentary top plan view illustrated on a larger scale than employed in FIG. 1 and showing the central portion of the auger of the header and the forwardmost portion of the elevator associated with the header, as seen on line 2—2 of FIG. 1.

FIG. 3 is a fragmentary vertical sectional view of the mechanism shown in FIG. 2 as seen on the line 3—3 thereof.

FIG. 4 is a fragmentary view of the central portion of the auger of the header disposed at an angle simulating a sloping position thereof as when operated on a sloping field surface.

FIG. 5 is a perspective view of one of the disc sections embodying the principles of the invention and adapted to be mounted upon the central axial tube of the auger in conjunction with additional disc sections to form said disc means of the present invention.

DETAILED DESCRIPTION

Figure 1:
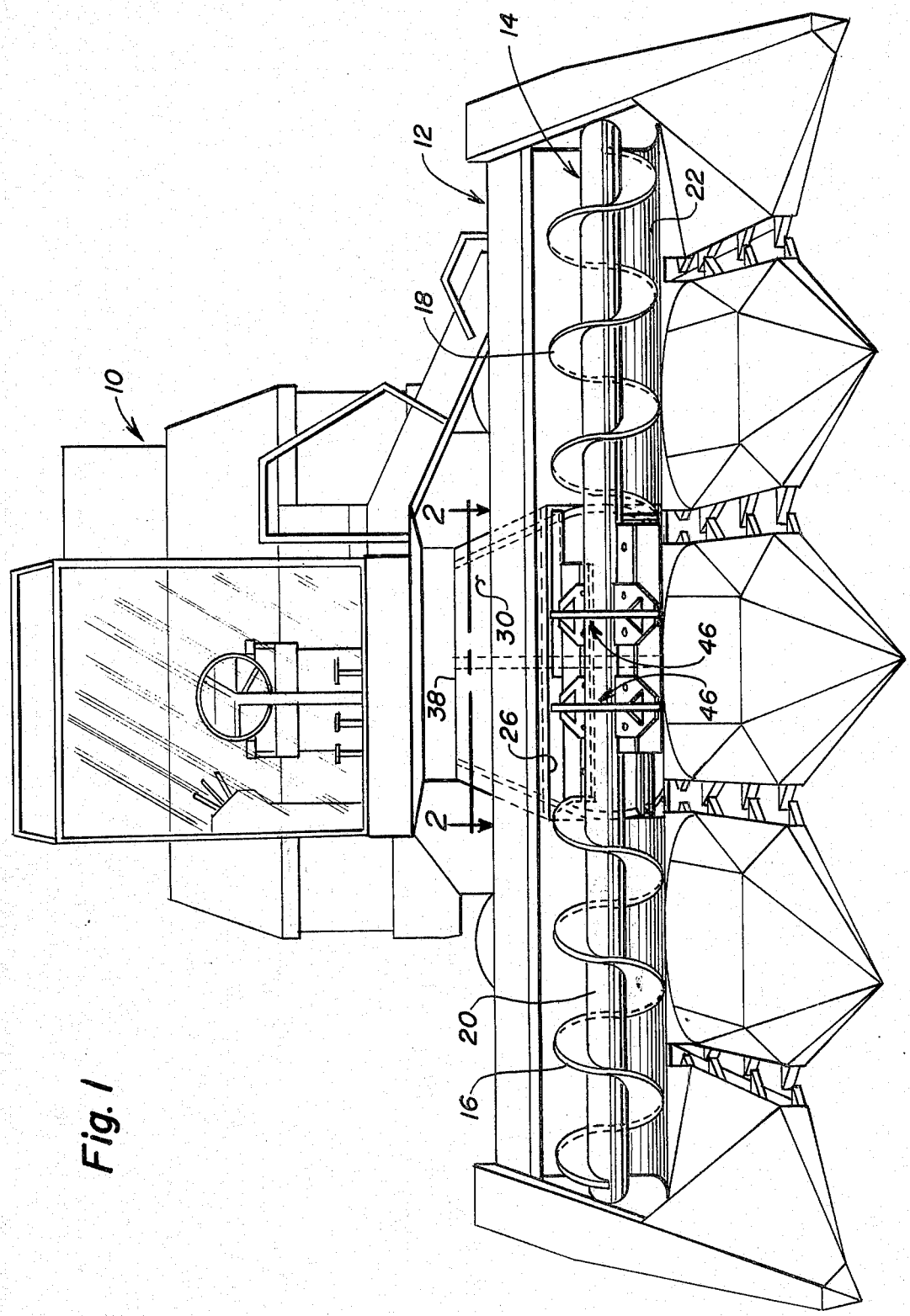
FIG. 1 is a front elevation of an exemplary combine of the type to which the present invention pertains and showing a header of the corn harvesting type mounted foremost on said combine, said view also illustrating details of the barrier means on the auger of the header which embody the principles of the present invention.

Referring to FIG. 1, it will be seen that the combine 10, which is of the mobile type such as illustrated in aforementioned prior Pat. No. 3,794,046, has a header 12, incorporating the principles of the present invention, supported on the forward end thereof which extends transversely to the longitudinal axis of the combine 10. The particular header 12 is of the type commonly referred to as a "corn head" being employed to harvest corn by removing the ears thereof from the stalks and then consolidating the ears by means of an auger 14 of the type having oppositely or reversely spiralled flights 16 and 18 which extend around a central axial tube 20 of a suitable diameter to resist any appreciable flexing during operation of the header. It should be understood that the principles of the present invention are also equally applicable to the "cutter bar" type header illustrated in the aforesaid patent which is usually employed to remove the heads of maize and the like from the stalks thereof.

The auger 14 operates in a trough 22 a portion of which is illustrated in FIG. 3 but also is designated in FIGS. 1 and 2. The inner edges of the flights 16 and 18 are securely fixed to the central axial tube 20, such as by welding, and the inner ends of the flights 16 and 18 are spaced apart in the midportion of the auger for purposes of accommodating elements comprising the essential features of the present invention, details of which are described hereinafter. As best seen in FIG. 3, the header 12 is provided with a substantially vertical, rear plate or wall 24, said wall being provided with a substantially rectangular, central opening 26 through which consolidated crop material is discharged by the auger 14 for reception by the inlet end 28 of elevator 30. The elevator 30, as best shown in FIG. 2, has a predetermined width and a housing which encloses an endless conveyor 32 which is shown fragmentarily in FIG. 3. Said conveyor comprises a series of chains 34 which extend around suitable cog gears 36, only the lower of which are shown in FIGS. 2 and 3 but cooperating gears also being located but not shown adjacent the upper, delivery end 38 of the elevator 30, as seen in FIG. 1. The cog gears 36 are fixed to and supported by a transverse shaft 40 shown in FIGS. 2 and 3 and it will be understood that the coacting cog gears which are mounted in the upper delivery end 38 of elevator 30, but not illustrated, are mounted upon a similar shaft, the shaft 40 and its unillustrated similar shaft in the upper end of the elevator 30 being supported within suitable bearings in side plates 42 of the housing which encloses the conveyor 32 of the elevator 30.

It also will be understood that the combine 10 has a threshing compartment, not shown, which is provided with its inlet end immediately adjacent the upper delivery end 38 of the elevator 30. The threshing compartment may be of the transversely-arranged type, or the axially-arranged type being shown at least fragmentarily in said aforementioned U.S. Pat. No. 3,794,046. Further, the header, as referred to above, whether of the type 12 primarily adapted to harvest ears of corn or of the type adapted to harvest the heads of maize, or other similar crop material heads, may be attached to either of the aforementioned combine types. When the combine is operating upon a sloping field surface in transverse relationship to the direction of slope with the header 12 disposed as illustrated in FIG. 4, crop material ears or heads of the aforementioned types have a tendency to slide longitudinally along the trough of the header during harvesting. Under such circumstances, there is a tendency for the product ears in the so called "uphill" end of the header 12 to slide downwardly toward the "downhill" end of the header 12 and if this were permitted to occur, it can be visualized that the separated crop material such as product ears 44 would be very substantially unevenly distributed by the auger 14 incident to moving the same through the dischage opening 26 of the header for reception by the conveyor 32, upon which the crop material also would be unevenly distributed upon one side with respect to the other of said conveyor and similarly be distributed in an uneven manner to one side of the threshing compartment as distinguished from the other side thereof, whereby the full threshing and cleaning capacity of the combine is not utilized.

To prevent the occurrence of such uneven accumulation or discharge of product material handled by the header 12 and especially the auger 14 therein, the present invention employs barrier means which in the preferred embodiment thereof comprise disc means 46 which are mounted preferably midway of the auger 14 between opposite ends thereof, as is clearly illustrated in FIG. 1 for example. To accommodate the disc means 46, it will also be seen in accordance with the preferred construction of the present invention that the inner ends of the flights 16 and 18 of the auger 14 are spaced axially apart, said spacing preferably being substantially coextensive with the width of the central opening 26 comprising the discharge means of the header. Further, the disc means 46 preferably comprises a pair of composite type discs 48 which respectively comprise a pair of disc segments 50 which are shown in detail, in perspective manner, in FIG. 5. The discs 48 are perpendicular to the axis of the auger 14 and to firmly secure the segments 50 of said discs 48 to the central axial tube 20, there is fixed to the central portion of the axial tube 20 a longitudinally extending flange 52 of relatively short radial dimensions, as best seen in FIGS. 3 and 4, the inner edges of said flanges being securely fixed to the periphery of axial tube 20 such as by welding. In view of the fact that each disc 48 is composed of a pair of the segments 50, a pair of the flanges 52 are provided, a clearly shown in FIG. 3, the same being in diametrically opposed positions upon tube 20 as shown in FIG. 3. As viewed in FIGS. 2 and 4, it will be seen that the upper flange 52 extends more to the left than the lower flange 52 which extends more to the right than upper flange 52 for purposes to be described.

The arcuate segments 50 of the compound discs 48 are each provided with transversely extending ears 54 which extend evenly to opposite sides of the segments 50 and each oppositely extending section is provided with a hole, through which detachable connecting bolts 56 extend as seen in FIG. 3. Said bolts also extend through holes in the flanges 52, which holes are axially aligned with the holes in the ears 54. To strengthen the segments 50 and permit them to resist deflecting tendencies occasioned by the operation of the combine upon tough, bulky material, the ears 54 and disc segments 50 have triangular gussets 58 welded to adjacent surfaces of said ears and segments. Especially as viewed in FIGS. 2 and 4, it is seen that the compound type discs 48 are of substantially the same height as the flights 16 and 18 of auger 14.

It also has been found to be advantageous to the present invention to provide radially extending beater blades 60 which are disposed in diametrically opposed positions as can be clearly seen from FIGS. 2, 3, and 4. The outer edges of the blades 60 preferably are coextensive with the rims of the discs 48. Also, said blades are preferably formed from stiff material having limited flexibility such as certain types of plastic, stiff rubber-like material, or otherwise. The upper blade 60 as viewed in FIG. 2 is coextensive with the upper flange 52 as viewd in said figure which extends more to the left than the lower flange 52 as viewed in said figure, whereby the lower beater blade 60 shown in FIG. 2 extends more to the right than the upper beater blade 60. The right hand end of the lower beater blade 60 also abuts or may be affixed to the inner end of the flight 18 and, correspondingly, the left hand end of the upper beater blade 60, as viewed in FIG. 2, extends to or may be connected to the inner end of the flight 16. Said beater blades also extend between the discs 48 and serve to provide positive means to feed crop material adjacent the discs 48 positively, in a preferably undershot manner, through the central discharge opening 26 of the header 14 and the corresponding inlet opening at the inlet end 28 of elevator 30 for engagement by the lower flight of the endless conveyor 32, due to the direction of rotation of both the auger 14 and cog gears 36, as indicated by the directional arrows shown on these respective members in FIG. 3.

From the foregoing, it will be seen that the present invention therefore provides very capable means for preventing undue axial movement of crop material, such as ears of corn and other similar products in the trough 22 of header 12, particularly when the combine is operated upon a sloping field surface of sufficient slope to tend to induce undesirable sliding of the crop material from the upper end of said header to the lower end thereof, for example, depending upon the direction in which the header is sloping. The discs 48 which effectively comprise barriers against such tendency of said crop material to slide by gravity under such circumstances are rugged and durable and the radial beater blades 60 which insure positive feeding of the separated crop material such as product ears 44 are readily secured to the flanges 52 by the same bolt means 56 which secure the ears 54 of the discs segments 50 to said flanges as can best be visualized from FIG. 3.

While the invention has been described and illustrated in its several preferred embodiments, it should be understood that the invention is not to be limited to the precise details herein illustrated and described since the same may be carried out in other ways falling within the scope of the invention as illustrated and described.

Having thus described the invention, what is claimed is:

1. A mobile combine having a threshing compartment, an elevator unit extending generally forwardly from the inlet end of said threshing compartment, and a header supported forwardly of the lower end of said elevator unit and extending transversely in opposite directions from the longitudinal axis of said combine, said header including a transverse auger of substantial length including a transversely-extending tube and flights fixed to said tube and respectively extending therealong from the outer ends of said header toward the center thereof, in combination with disc means mounted to a generally central portion of said auger tube between the inner ends of said flights thereon and operable to prevent axial movement of crop material from one of said flights past the central portion of said auger tube to the other of said flights, said disc means generally having a height relative to the height of the flights of said auger to provide a sharply defined barrier to said aforementioned axial movement of crop material between said flights and thereby assure relatively even feeding of crop material to said threshing compartment.

2. The mobile combine according to claim 1 in which said disc means comprise a pair of discs fixed to said auger and spaced axially apart a limited distance at opposite sides of the center of said auger to effect distinct separation between the mats of crop material respectively delivered by said auger to said elevator.

3. The mobile combine according to claim 2 in which said auger additionally includes longitudinally extending beater blades of limited length extending radially from said tube of said auger between said pair of discs thereon, said bales being spaced circumferentially around said tube of said auger and operable to positively direct crop material from said auger into an inlet end of said elevator.

4. The mobile combine according to claim 1 in which the inner ends of said flights respectively are spaced limited distances from said disc means and additional radially-extending beater blades being fixed to said tube of said auger so as to extend between said disc means and inner ends of said auger flights.

5. The mobile combine according to claim 1 in which the height of said disc means is substantially equal to the height of said flights.

6. The mobile combine according to claim 5 in which said disc means comprise a pair of discs spaced apart axially along said auger respectively on opposite sides of the mid-point of said auger and operable to produce a separation in the mats of crop material respectively advanced by said spiralled flights toward the auger center for delivery to the elevator in the form of a pair of mats of crop material and thereby minimizing any substantial tendency for crop material to be disposed on said elevator more heavily on one side than the other due to operation of the combine on sloping field areas.

7. The mobile combine according to claim 6 further including a plurality of axially extending radial blades being positioned between the inner ends of said flights and said discs, said plurality of discs respectively being spaced circumferentially around the axis of said auger and the outer edges of said blades being substantially co-extensive with the outer edges of said flights of said auger.

8. The mobile combine according to claim 1 in which said disc means comprise a plurality of arcuate discs segments, transversely extending ears fixed to the opposite ends of said segments, and means connecting said transversely extending ears of a pair of said segments in assembled relationship to provide compound discs constituting said disc means.

9. The mobile combine according to claim 8 further including radial flanges of restricted height extending longitudinally along the central portions of said central axial tube of said auger respectively in circumferentially spaced relationship to each other upon said central tube, and said ears of said disc segments being attached to said flanges by said connecting means to provide said compound discs.

* * * * *